United States Patent [19]
Svendsen

[11] Patent Number: 5,673,612
[45] Date of Patent: Oct. 7, 1997

[54] COEXTRUDING EXTRUDER ESPECIALLY FOR FOODSTUFFS SUCH AS PASTE AND STUFFING

[75] Inventor: Torben Jørgen Svendsen, Brønshøj, Denmark

[73] Assignee: Megabite ApS, Copenhagen, Denmark

[21] Appl. No.: 591,573

[22] PCT Filed: Jul. 7, 1993

[86] PCT No.: PCT/DK93/00233
§ 371 Date: Jan. 11, 1996
§ 102(e) Date: Jan. 11, 1996

[87] PCT Pub. No.: WO95/01726
PCT Pub. Date: Jan. 19, 1995

[51] Int. Cl.[6] .................. A23P 1/00; B29C 47/00; B29C 47/06
[52] U.S. Cl. .................. 99/450.7; 99/353; 99/450.1; 425/133.1; 425/307
[58] Field of Search .................. 99/494, 450.1–450.8, 99/353; 425/131.1, 133.1, 379.1, 144, 307–311; 426/94, 283, 516; 366/318–324, 79–87

[56] References Cited

U.S. PATENT DOCUMENTS

| | | |
|---|---|---|
| 1,265,853 | 5/1918 | Wiseman . |
| 1,647,683 | 11/1927 | Bollinger . |
| 2,764,780 | 10/1956 | Reifenhauser . |
| 2,769,201 | 11/1956 | Lorenian . |
| 4,251,201 | 2/1981 | Krysiak .................. 425/133.1 |
| 4,630,533 | 12/1986 | Schaaf et al. .................. 426/516 X |
| 4,698,000 | 10/1987 | Thulin et al. .................. 425/133.1 |
| 4,767,305 | 8/1988 | Tashiro .................. 425/308 |
| 4,859,165 | 8/1989 | Hoashi .................. 99/353 X |
| 4,882,185 | 11/1989 | Simelunas et al. . |
| 4,905,587 | 3/1990 | Smithers .................. 99/450.7 X |
| 5,417,992 | 5/1995 | Rizvi et al. .................. 99/450.6 X |

FOREIGN PATENT DOCUMENTS

| | | |
|---|---|---|
| 0 130 748 A2 | 6/1983 | European Pat. Off. . |
| 1 553 925 | 12/1976 | United Kingdom . |

*Primary Examiner*—Timothy F. Simone
*Attorney, Agent, or Firm*—Browdy and Neimark

[57] ABSTRACT

A coextruding extruder, for foodstuffs such as pastes and stuffing, comprising an extruder mantle (1), a rotatable worm member received within said mantle and an extruder head, said worm member having an axis of rotation and comprising a plurality of flights corresponding to the number of materials to be coextruded, said flights being arranged coaxially and successively with a common forward direction of transport of the materials to be coextruded, a first flight (9) of said plurality of flights behind a second flight (8) of said plurality of flight, an opening (29) on said worm member between said first flight (9) and said second flight (8), said first flight (9) communicating through said opening (29) with a duct (22) extending forward and arranged within said second flight and an axially displaceable reversal member being provided in a flight of said plurality of flights for controlled rerouting of material forwarded by said flight.

8 Claims, 5 Drawing Sheets

COEXTRUDING EXTRUDER ESPECIALLY FOR FOODSTUFFS SUCH AS PASTE AND STUFFING

BACKGROUND OF THE INVENTION

1. Technical Field of the Invention

The present invention relates to a coextruding extruder especially for foodstuffs like paste and stuffing, said extruder comprising a mantle surrounding a number of flights corresponding to the number of materials to be coextruded, and an extruder head. The flights in the extruder are coaxial and placed in extension of each other in the common transport direction of the materials, and the front end of a flight which is behind is connected to a duct which within the flight/flights ahead extends to the front end of the front flight.

2. Prior Art

Coextrusion is a generally known process which is used when it is desired to extrude an object which over its cross section comprises various materials. From the plastic industry it is thus known to coextrude profiles, in which various parts of the profile for instance have different hardnesses. From the food industry it is for instance known to coextrude paste like canelloni, i.e. paste tubes with stuffing.

In some of the known machines for coextrusion separate extruders are used for extrusion of the individual materials, which are each conveyed to a common extruder head, in which the desired profile with the desired distribution of material is provided.

Extruders are known, in which the two flights are mounted one within the other, see for instance U.S. Pat. Nos. 1,647,683, 2,764,780 and 2,769,201.

Furthermore, an apparatus is known from U.S. Pat. No. 1,265,853, which apparatus consists of two extruders placed in extension of each other, where the outlet from the rear extruder is passed coaxially through the worm member in the front extruder to the outlet of the latter. The two extruders are driven by a gear transmission by means of a single crank handle. There are no means for direct control of the ratio between the amount of material delivered from the two extruders.

OBJECT AND SUMMARY OF THE INVENTION

The object of the invention is to provide an extruder for coextrusion, in which the need for use of separate extruders for the individual materials is eliminated, and where there is a possibility of adjusting the ratio between the extruded amount of the individual materials.

This is attained according to the invention by means of an extruder of the type mentioned by way of introduction, which extruder is characteristic in that several flights for different materials are provided in a single worm member and that within the mantle at a flight an axially displaceable reversal member for controlled rerouting of extruded material is provided.

In a first embodiment, the duct extends backwards from the point for connection with the front end of the flight behind to the inlet of the flight behind, where the duct is also connected with the flight. An axially displaceable member in the duct comprises a wall adapted by axial displacement to connect the front end of the flight with the forward facing and/or backward facing part of the duct. Hereby it becomes possible to rerout the material conveyed by the flight behind back to the inlet of the flight, the possibility of controlling the amount of material conveyed by the flight behind being thus provided.

In a second embodiment, a flight is conically tapering and a corresponding conical, surrounding mantle portion is axially displaceable relative to the flight. Hereby it becomes possible to adjust the gap between the windings of the flight and the surrounding mantle, whereby it becomes possible to reroute part of the material conveyed and to consequently adjust the amount of material discharged from the flight.

In a further embodiment the conical mantle portion is fixed against rotation relative to the housing of the extruder and adapted to be axially displaced by means of an internally threaded union which is axially movable relative to either the extruder housing or the conical mantle portion and axially fixed relative to the other one of these two.

Extruded articles like paste are normally cut up in pieces of a predetermined length, for which reason at the outlet of the extruder head a rotating knife rotating around an axis parallel with the flights is provided for the cutting of an extruded string. This knife is according to an embodiment of the invention sickle-shaped to get the best possible cut.

An extruder which in an embodiment of the invention is intended for the manufacture of ravioli is at the outlet of the extruder head provided with a driven pair of rollers, in which preferably one roller is circular-cylindrical and the second roller comprises recesses in the roller surface. According to this embodiment of the invention the pair of rollers is mounted displaceably towards and away from the outlet from the extruder head, the pair of rollers is biased towards a resting position, sensing means are provided for sensing the position of the pair of rollers in relation to the resting position, and the drive of the pair of rollers is adapted to be controlled depending on said sensing.

BRIEF DESCRIPTION OF THE DRAWINGS

The invention will be explained in the following by means of embodiments with reference to the drawing, in which.

DETAILED DESCRIPTION OF THE PREFERRED EMBODIMENT(S) OF THE INVENTION

Figure 1:
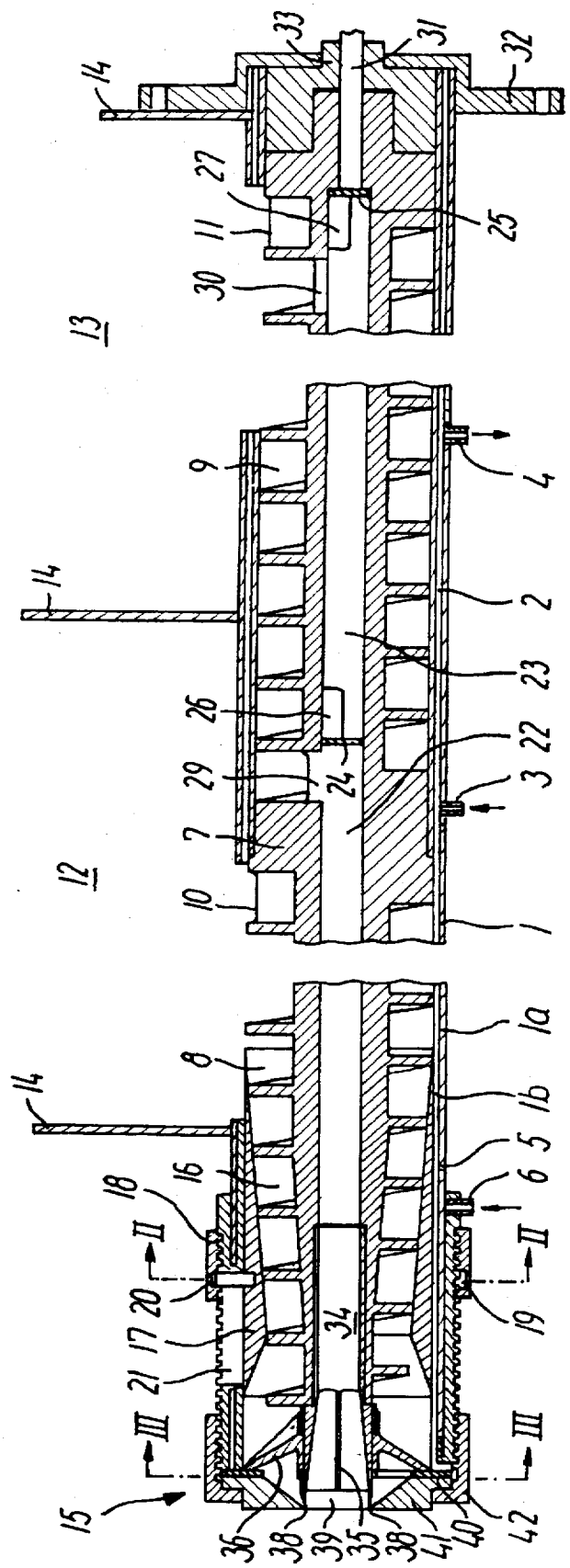
FIG. 1 shows a broken sectional view through an extruder according to the invention, FIG. 2 a sectional view along the line II—II in FIG. 1, FIG. 3 a sectional view along the line III—III in FIG. 1, FIG. 4 a second embodiment of a conical mantle portion, FIG. 5 a rotating knife for the cutting of extruded paste, and FIG. 6 equipment for the manufacture of ravioli.

FIG. 1 shows an extruder intended for the manufacture of filled paste. The extruder comprises a housing 1 consisting of two coaxial tubes 1a,1b, where a peripheral helical recess 2 has been established in the tube 1b to provide a cooling water duct with an inlet spigot 3 and an outlet spigot 4. At the front of the extruder a second cooling water duct 5 with an inlet spigot 6 has been provided.

A worm member 7 extends through the major part of the length of the housing 1. This worm member 7 comprises two flights 8 and 9. In the wall of the housing 1 inlets 10 and 11 are provided for the flights 8 and 9, respectively. These inlets 10 and 11 are provided at the bottom of reservoirs 12 and 13 which are provided for the materials to be extruded. The inlet reservoirs 12 and 13 are schematically indicated by means of partition walls 14. The extruder is provided with an extruder head 15 comprising the front part of the housing 1. The extruder head comprises several exchangeable parts and will be described in detail below.

The front flight 8 has a conical pressure-building part 16 which is surrounded by a corresponding conical mantle portion 17 which is axially displaceable relative to the housing 1 and the worm member 7. Axial displacement of the mantle portion is achieved by the turning of an internally threaded union 18. The union is provided with an internal peripheral groove 19 receiving three pins 20, said pins extending through longitudinal slits through the housing 1 to fixedly engage the mantle portion 17. The housing is provided with an external thread corresponding to the internal thread of the union 18, whereby the union when rotating moves forwards or backwards relative to the housing 1, and due to the fact that the pins 20 are received in the groove 19, the mantle portion 17 will follow the axial movement of the union 18.

A central duct 22 extends through the major part of the length of the worm member 7, said duct discharging at the front end of the worm member at the exctruder head 15. The duct 22 holds a tube 23, which is closed at the ends by walls 24 and 25. The tube 23 is axially displaceable, but fixed against rotation relative to the worm member 7 and comprises at the ends openings 26 and 27 facing the wall of the duct 22, said openings being mutually positioned in the same way as openings 29 and 30 between the rearmost flight 9 and the duct 22. The tube 23 is axially displaceable in the worm member 7 by means of a rod 31.

The housing 1 is closed at tahe end by means of a cover 32, through which a transmission member 33 and the rod 31 extend.

The extruder functions in such a way that paste dough to be extruded to an outer layer in the finished product is placed in the inlet reservoir 12, from where it, through the inlet 10 to the front flight 8, penetrates into this flight and is conveyed forwards towards the extruder head 15. On its way the dough passes the pressure building part 16, where on the one hand a pressure is built up in the dough and on the second hand a rerouting of a part of the dough may be performed by displacement of the mantle portion 17 forward, a clearance being provided between the flanges of the flight 8 and the mantle portion 17, through which clearance part of the dough can move back.

Filling, for instance stuffing, which is to constitute the interior part of the finished product, is filled in a similar way into the inlet reservoir 13 and penetrates through the inlet 11 down into the flight 9 and is conveyed forwards by the rotation of the worm member 7. The filling is led to the opening 29 from the flight to the duct 22 and from there through the duct 22 towards the extruder head 15. By means of the tube 23 and axial displacement thereof, a major or a smaller part of the conveyed filling may be led through the opening 26 through the tube 23 to the openings 27 and 30 and out into the flight 9 at the inlet opening 11 from the inlet reservoir 13. In this way the conveyed amount of stuffing is controlled.

Figure 2:
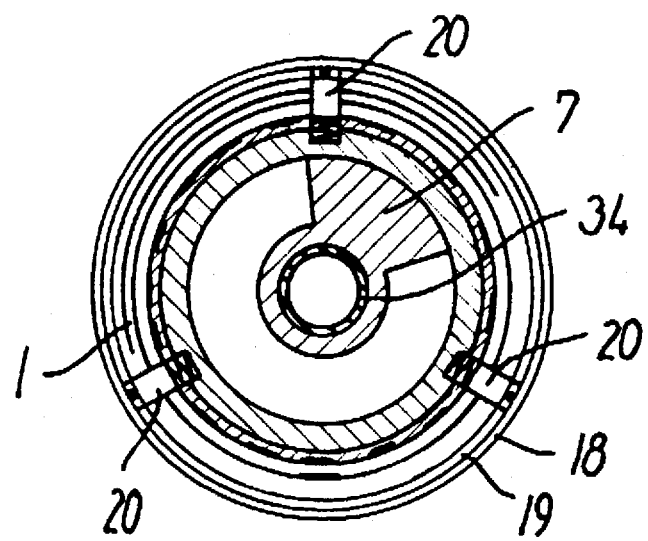
Figure 3:
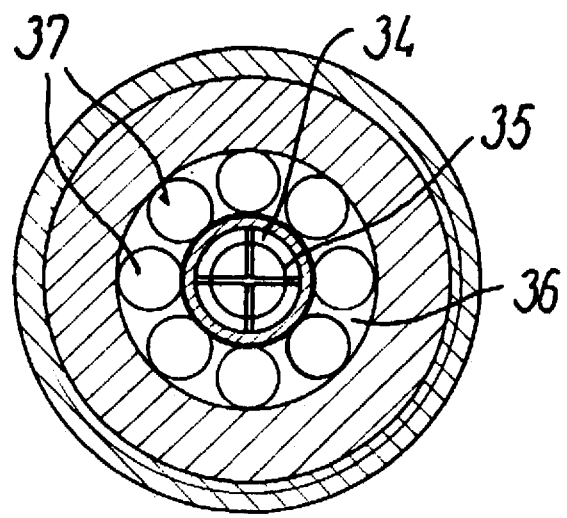

In the extruder head, which is shown partly in FIG. 1, partly in FIGS. 2 and 3, which are cross sectional views in relation to FIG. 1, a receiving tube 34 is provided for the material coming from the duct 22, and in the receiving tube 34 an alignment cross 35 is provided for the alignment of the flow of the material coming from the duct 22. The receiving tube 34 is held by means of a member 36 having a screw flange with openings for the distribution and the passage of the material coming from the front flight 8. Having passed the openings 37 in the flange of the member 36, the material coming from the front flight 8 is led out through an annular nozzle 38. The material coming from the rearmost flight 9 is led out through a central opening 39 within the annular nozzle 38. The extruder head 15 is sealed and closed by means of a sealing 40, an annular cover 41, and a union 42. The individual members of the extruder head 15 may be replaced by other members known from machines for the extrusion of paste.

Figure 4:
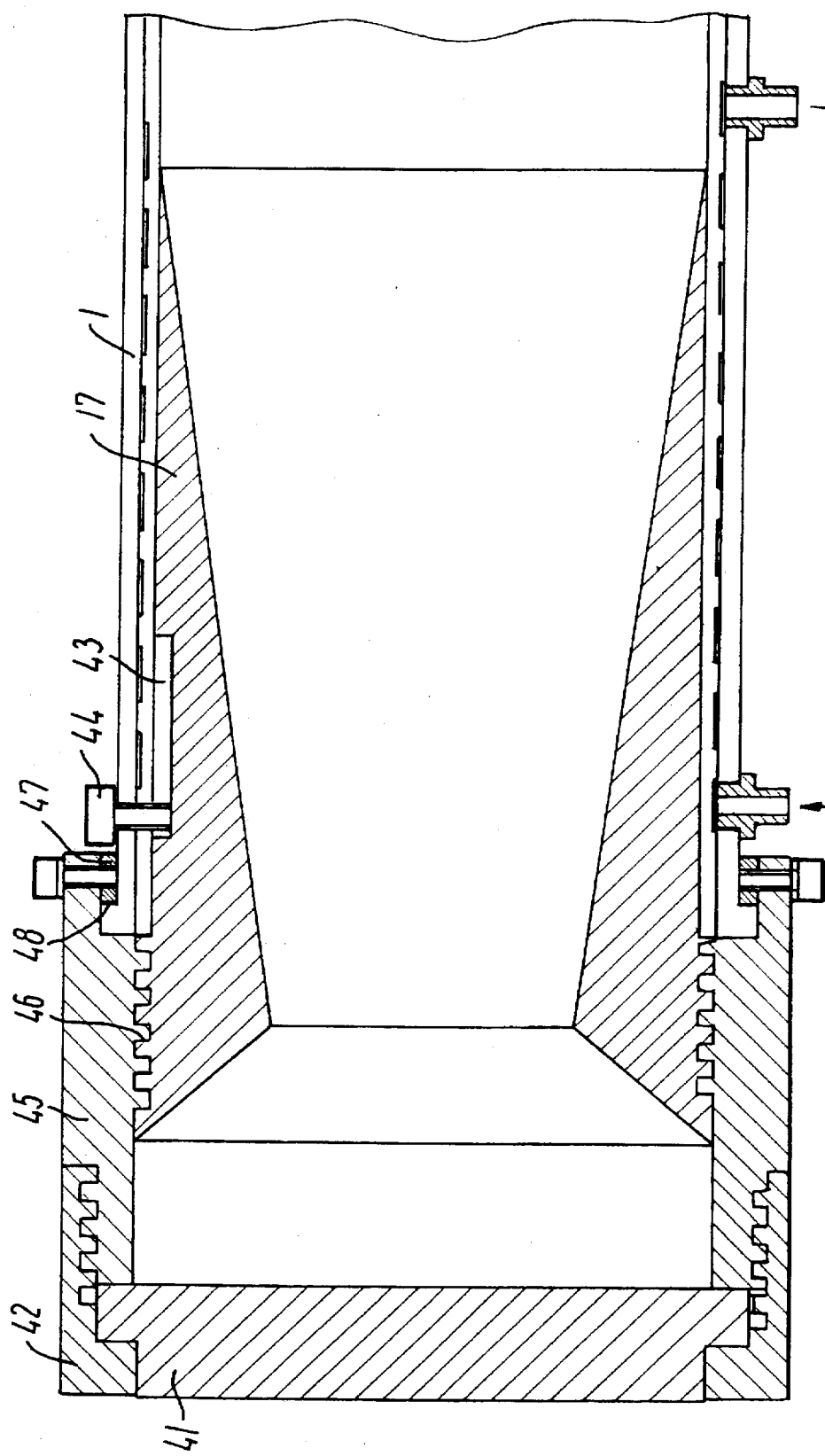

In FIG. 4 an alternative embodiment of the front part of the housing 1 is shown with another mechanism for the displacement of the mantle portion 17. The mantle portion 17 comprises a longitudinal recess 43 engaging a screw 44 mounted in the housing 1. The front part of the housing is constituted by a tube part 45 with an internal thread. The union 42 and the cover 41 are mounted on the tube part 45. The remaining members of the extruder head 15 are not shown. The tube part 45 is fixed to the housing 1 by means of a ring 47 which is screwed onto the tube part 45 and engages a rim 48 at the end of the housing 1. In this way the tube part 45 becomes axially fixed, but rotatable relative to the housing 1. By rotation of the tube part 45, the mantle portion 17, which is provided with an external thread engaging the internal thread 46 of the tube part 45, is moved axially relative to the housing 1, as it is prevented from rotating by the screw 44.

Figure 5:
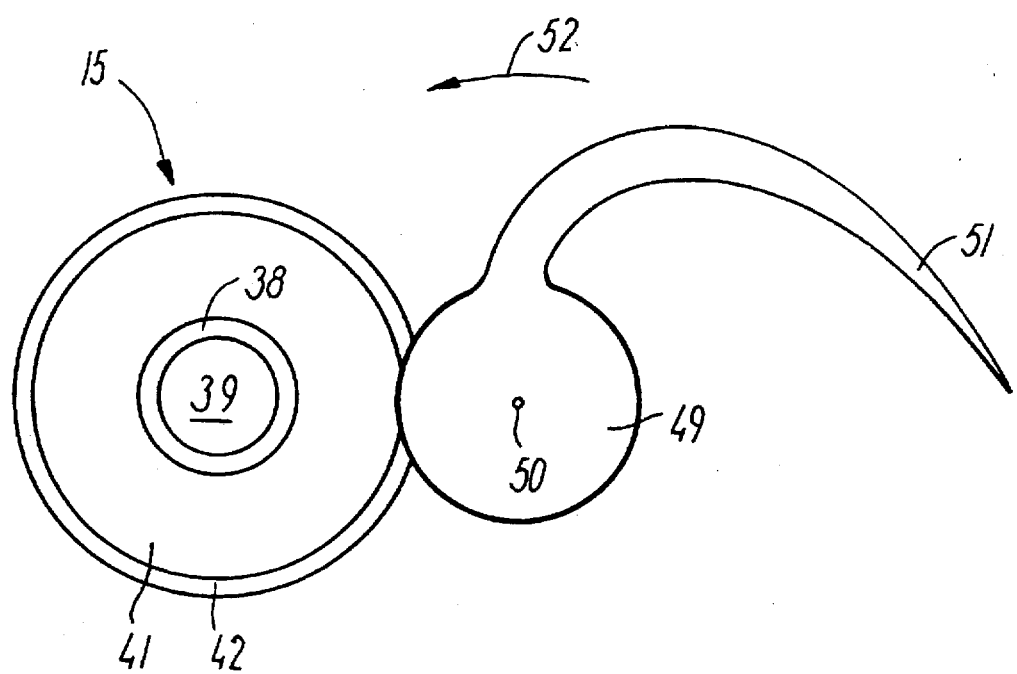

FIG. 5 shows the outlet from the extruder head 15 with the union 42, the cover 41, the annular nozzle 38, and the opening 39. Next to the extruder head 15 a rotating knife 49 is provided, the rotational axis 50 of which is parallel with the rotational axis of the worm member 7. The blade 51 of the knife 49 has the shape of a sickle and moves in the direction of the arrow 52. By the rotation of the knife 49 an extruded article will be cut into lengths by means of a cut, during which the cutting edge of the blade 51 is moved obliquely through the extruded article relative to its longitudinal direction, which results in a good cut.

Figure 6:
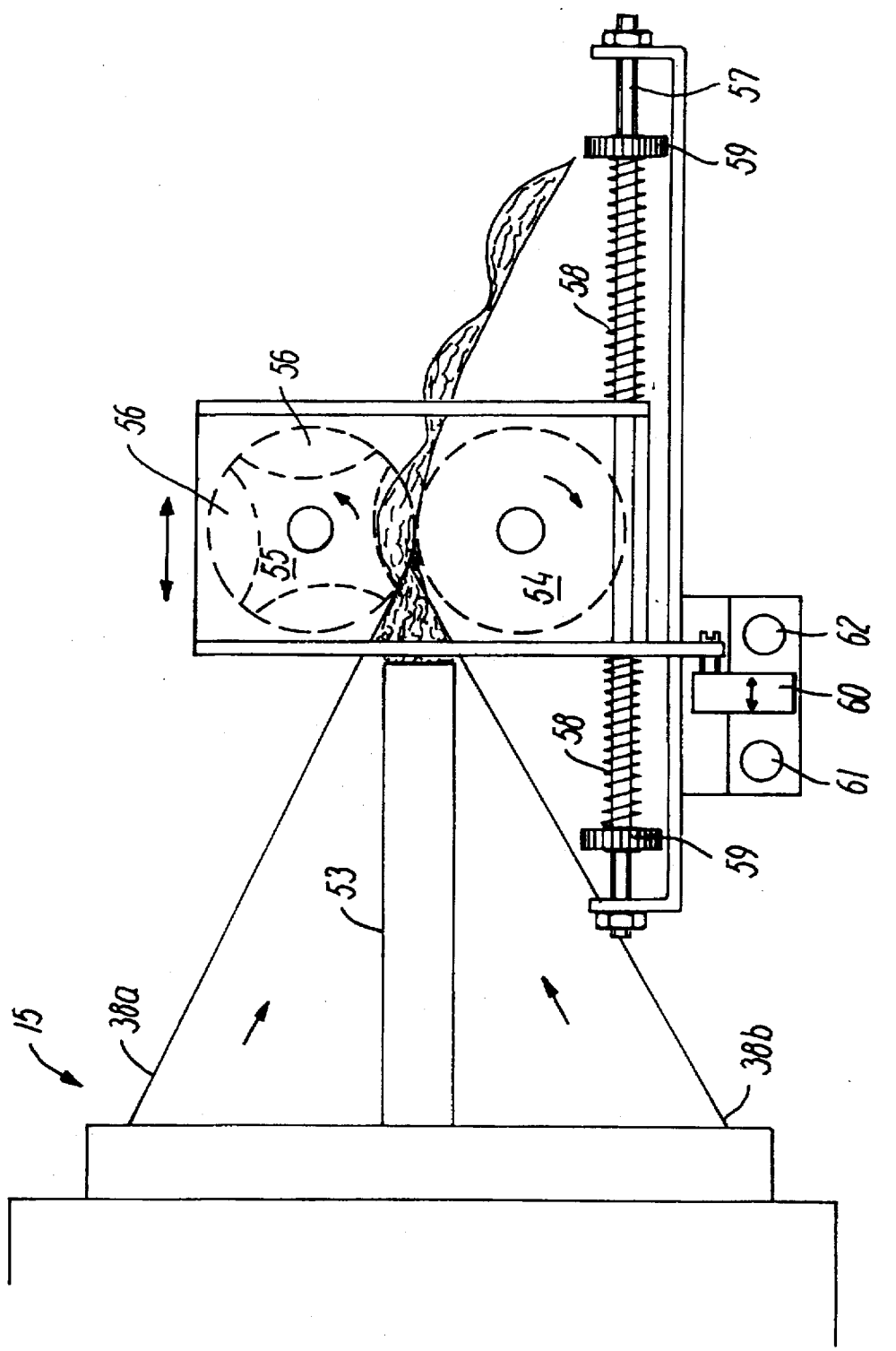

In FIG. 6 the extruder head 15 is shown, which in this case is provided with equipment for the manufacture of ravioli. This equipment comprises a protruding tube 53 in extension of the duct 22. Moreover, a pair of rollers 54, 55 are provided, the roller 54 being circular-cylindrical while the roller 55 is provided with recesses 56 in its roller surface. The annular nozzle 38 is in this case divided in two in an upper and a lower half 38*a* and 38*b*, an upper and a lower band of paste dough being thus extruded. These two bands are rolled together by means of the rollers 54, 55, and the tube 53 feeds stuffing between the bands, where on account of the recesses 56 in the roller 55 the stuffing is embedded in pockets between the two paste dough bands.

To make this ravioli equipment function properly it is of importance that the speed of the rollers 54 and 55 is adjusted in relation to the speed of extrusion. Therefore, the pair of rollers 54, 55 is mounted displaceably on a threaded rod 57, and two springs 58 biases the pair of rollers 54, 55 towards an equilibrium position relative to the extruder head 15. The equilibrium position may be adjusted by means of nuts 59 on the threaded rod 57. An arm 60 which is fixed in relation to the pair of rollers is adapted to influence two switches 61 and 62.

When ravioli is manufactured, the pair of rollers 54, 55 moves towards the extruder head 15 on account of the combined power of the springs 58 and thereby establish a certain tension in the paste dough bands. If the pair of rollers 54, 55 rotates too quickly, the arm 60 will be drawn towards the switch 61 which is thereby activated and causes a reduction of the rotational speed of the pair of rollers. If the pair of rollers runs too slowly, the arm 60 will on account of the force of the springs 58 be taken back to the switch 62, which is activated and causes an increase of the rotational speed of the pair of rollers. Thus, the rotational speed of the pair of rollers and the tension in the paste dough bands are controlled.

What is claimed is:

1. A coextruding extruder, for foodstuffs such as pastes and stuffing, comprising an extruder mantle (1), a rotatable worm member received within said mantle and an extruder head, said worm member having an axis of rotation and comprising a plurality of flights corresponding to the number of materials to be coextruded, said flights being arranged coaxially and successively with a common forward direction of transport of the materials to be coextruded, a first flight (9) of said plurality of flights behind a second flight (8) of said plurality of flights, an opening (29) on said worm member between said first flight (9) and said second flight (8), said first flight (9) communicating through said opening (29) with a duct (22) extending forward into said second flight, and, an axially displaceable reversal member being provided in a flight of said plurality of flights for controlled rerouting of material forwarded by said flight.

2. An extruder according to claim 1, wherein said duct (22) extends back from said opening (29) to an inlet (11) of the first flight (9), wherein the duct (22) is connected with the first flight (9), and wherein the reversal member comprises a member (23) in the duct (22), said member having a wall (24), said wall being axially displaceable to permit communication between a front end of the flight (9) with the duct (22).

3. An extruder according to claim 1, wherein said second flight (8) is conically tapered and the extruder mantle comprises a corresponding conical, surrounding mantle portion (17) which is axially displaceable relative to said second flight (8).

4. An extruder according to claim 3, wherein the conical mantle portion (17) is fixed against rotation relative to the extruder mantle and is displaceable by means of an internally threaded union (18) which is axially movable relative to the extruder mantle (1) and axially fixed relative to the mantle portion (17).

5. An extruder according to claim 3, wherein the conical mantle portion (17) is fixed against rotation relative to the extruder mantle and is displaceable by means of an internally threaded union (18) which is axially movable relative to the mantle portion (17) and axially fixed relative to the extruder mantle (1).

6. An extruder according to claim 1, wherein a rotating knife (49) rotating around an axis (50) parallel to an axis of rotation of the worm member is provided at an outlet from the extruder head (15) for the cutting of an extruded string, wherein the blade (51) of the knife (49) is sickle-shaped.

7. An extruder according to claim 1, in which at an outlet from the extruder head (15) a driven pair of rollers (54, 55) is provided, wherein one roller (54) is circular-cylindrical and the second roller (55) comprises recesses (56) in a roller surface, wherein the pair of rollers (54, 55) is mounted displaceably towards and away from the outlet from the extruder head (15), the pair of rollers (54, 55) being biased towards a resting position, sensing means (60, 61, 62) being provided for sensing the position of the pair of rollers (54, 55) in relation to the resting position, and a drive of the pair of rollers being controlled depending on said sensing.

8. A coextruding extruder, for foodstuffs such as pastes and stuffing, comprising an extruder mantle (1), a rotatable worm member received within said mantle and an extruder head, said worm member having an axis of rotation and comprising a plurality of flights corresponding to the number of materials to be coextruded, said flights being arranged coaxially and successively with a common forward direction of transport of the materials to be coextruded, a first flight (9) of said plurality of flights behind a second flight (8) of said plurality of flights, an opening (29) on said worm member between said first flight (9) and said second flight (8), said first flight (9) communicating through said opening (29) with a duct (22) extending forward and arranged within said second flight.

* * * * *